United States Patent [19]

Naito

[11] Patent Number: 4,735,273

[45] Date of Patent: Apr. 5, 1988

[54] FIXED SPEED CRUSING CONTROL APPARATUS FOR A VEHICLE

[75] Inventor: Yasuo Naito, Himeji, Japan

[73] Assignee: Mitsubishi Denki Kabushiki Kaisha, Tokyo, Japan

[21] Appl. No.: 53,640

[22] Filed: May 26, 1987

[30] Foreign Application Priority Data

May 26, 1986 [JP] Japan .................................. 61-123054

[51] Int. Cl.$^4$ ............................................. B60K 31/04
[52] U.S. Cl. ..................................... 180/179; 123/350; 364/431.07
[58] Field of Search ................ 180/178, 179; 123/350, 123/361, 360; 364/431.07

[56] References Cited

U.S. PATENT DOCUMENTS 4,066,874 1/1978 Shaw .
4,325,336 4/1982 Kuno ..................................... 123/350

FOREIGN PATENT DOCUMENTS

191431 11/1982 Japan .................................. 123/350

Primary Examiner—Henry A. Bennett
Attorney, Agent, or Firm—Oblon, Fisher, Spivak, McClelland & Maier

[57] ABSTRACT

A fixed speed cruising control apparatus for a vehicle comprises a cruising speed detecting means, a signal smoothening means, smoothening-characteristic adjusting means, and a driving force control means wherein the signal-smoothening-characteristic adjusting means generates to the signal smoothening means a signal on the basis of a smoothened cruising speed signal from the signal smoothening means so that noise components in the smoothened cruising speed signal are cancelled in the smoothening means.

4 Claims, 6 Drawing Sheets

FIXED SPEED CRUSING CONTROL APPARATUS FOR A VEHICLE

BACKGROUND OF THE INVENTION

1. Field of the Invention:

The present invention relates to a fixed speed cruising control apparatus for a vehicle to automatically keep cruising speed of the vehicle constant.

Figure 7:
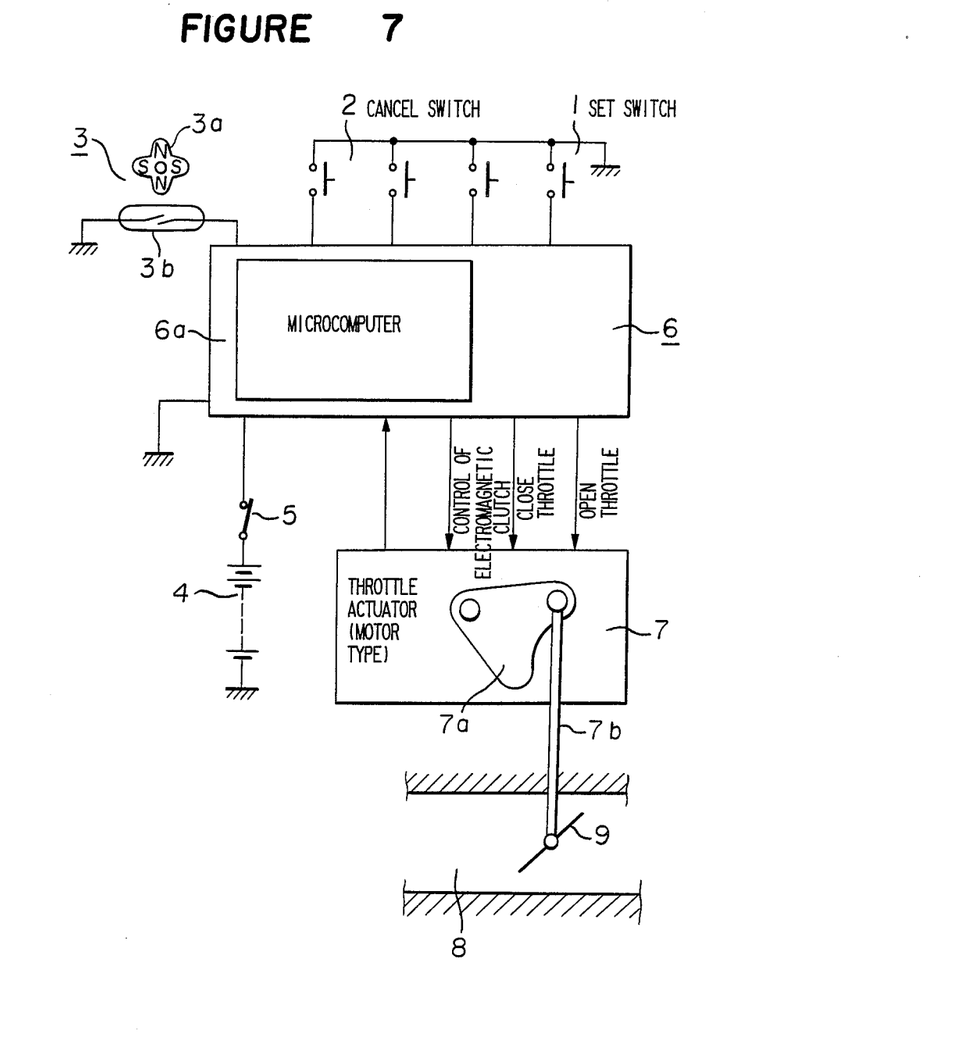
FIG. 7 is a diagram showing a conventional fixed speed cruising control apparatus.

2. Discussion of Background:

FIG. 7 is a diagram showing a conventional fixed speed cruising control apparatus disclosed, for instance, in Japanese Unexamined Patent Publication No. 39311/1983. In FIG. 7, a reference numeral 1 designates a set switch operable by a driver to command initiation of a fixed speed cruising, a numeral 2 designates a cancel switch which is actuated by operating a braking device (not shown), whereby instructions of cruising at a fixed speed is cancelled, and a numeral 3 designates a vehicle speed sensor to detect cruising speed of a vehicle (not shown). The sensor 3 comprises a rotating body 3a having four magnetic poles and a lead switch 3b. The rotating body 3a is rotated by a meter cable (not shown) for transmitting revolution of a transmission (not shown), and outputs a signal consisting of a pulse train having a frequency in proportion to the cruising speed. A numeral designates a car battery, a numeral 5 designates a main switch as a power source switch to feed electric power in the car battery 4, a numeral 6 designates a control apparatus which is actuated by the operation of the main switch 5 and which includes a processing circuit 6a constituted by, for instance, a micro-computer. The control apparatus 6 receives signals from the set switch 1, the cancel switch 2 and the speed sensor 3 and performs processing of the signals so that the cruising speed vs of the vehicle is brought to the target speed vr, whereby various control signals are outputted to carry out automatic control for the speed of the vehicle. A numeral 7 designates a motor-driven type throttle actuator which receives various control signals from the control apparatus 6 and which opens and closes through a link 7a and a motor (not shown) a throttle valve 9 which is disposed in an air intake passage 8 for an engine (not shown), and is operable in association with an accelerator pedal (not shown). The link 7a is connected to the motor by means of an electromagnetic clutch (not shown). Connection and disconnection of the link 7a to the motor is controlled by a signal from the control apparatus 6.

The operation of the conventional fixed speed cruising control apparatus having the construction as above-mentioned will be described.

On actuation of the main switch 1 by the driver, electric power in the car battery 4 is supplied to the control apparatus 6. Then, the control apparatus 6 processes output a signal of the speed sensor 3. The speed sensor 3 outputs a signal of pulse train having a frequency in proportion to the cruising speed vs of the vehicle. By measuring the frequency of the signal in the control apparatus 6, the actual cruising speed vs is calculated.

When the driver operates the main (set) switch 1, the signal of the switch 1 is supplied to the control apparatus 6 in which the cruising speed vs at that time is memorized as a target speed vr and then, control for the fixed cruising speed is started. The control apparatus 6 compares the actual cruising speed vs supplied at every moment with the target speed vr and outputs a control signal to have the vehicle travel at the target speed vr. The throttle actuator 7 is actuated by the control signal to adjust the degree of opening of the throttle valve 9. Namely, when the actual speed vs is lower than the target speed vr, a signal for opening the throttle valve is generated to open the valve 9 by a predetermined aperture. On the other hand, when it is higher than the target speed, a signal for closing the throttle valve is generated to close the valve 9 by a predetermined aperture. Accordingly, the vehicle travels at a fixed speed without operating the accelerator pedal.

When the driver operates the braking device during the controlling operation for the fixed speed cruising, the cancel switch 2 is actuated by which a signal for reducing the fixed speed cruising is supplied to the control apparatus 6. Then, the control apparatus outputs a signal for braking the electromagnetic clutch, and the clutch is disengaged by the throttle actuator 7 as soon as it receives the signal. Thereafter, the driver adjusts the degree of opening of the throttle valve by the accelerator pedal to thereby control the cruising speed.

In the conventional fixed speed cruising control apparatus having the construction as above-mentioned, the cruising speed signal from the speed sensor 3 changes by various causes even when the vehicle travels at a certain fixed speed. In this case, a control signal is outputted to correct deviation caused between the actual cruising speed vs and the target speed vr, whereby the throttle actuator 7 is actuated. When the throttle valve is controlled to be opened or closed by the actuator 7, the driver and passengers feel uncomfortableness due to acceleration and decceleration of the vehicle.

It is considered that unstable outputs of the speed sensor 3 are resulted from, for instance, eccentricity of the revolution center of the rotating body 3a of the speed sensor 3, or uneven rotation of a wire cable for connecting the transmission to the rotating body 3a, in addition to electric noises which are generated inside or outside the vehicle. The unstable outputs of the speed sensor 3 depend on the revolution number of the rotating body 3a, i.e. cruising speed. Further, characterstics of the sensor largely affects the unstable outputs. To eliminate such disadvantage, there has been known a method of smoothening the cruising speed signal by a low-pass filter to thereby reduce the electric noises. However, use of the low-pass filter greatly reduces response of a control system because it is necessary to use the low-pass filter having a large time constant. Thus, in the conventional apparatus, it was very difficult to satisfy both conditions of reducing the electric noise components and maintaining high response properties of the control system.

SUMMARY OF THE INVENTION

It is an object of the present invention to provide a fixed speed cruising control apparatus for a vehicle which provides stable controlling operation for acceleration and decceleration of the vehicle to thereby impart passengers comfortable riding.

The foregoing and the other objects of the present invention have been attained by providing a fixed speed cruising control apparatus for a vehicle which comprises a cruising speed detecting means for detecting cruising speed of a vehicle to generate a cruising speed signal, a smoothening means having changeable smoothening characteristics which receives the cruising speed signal to smoothen the same and outputs a smoothened cruising speed signal. A signal-smoothening-characteristic adjusting means which receives the smoothened cruising speed signal and processes the same to output a signal-smoothening-characteristic adjusting signal so as to cancel a signal of noise component in the smoothened cruising speed signal which is included in an output value obtained by processing; a driving force control means which compares the smoothened cruising speed signal generated from the smoothening means with a target speed signal for maintaining the vehicle at a given target speed to thereby control a driving force to the vehicle, wherein the signal-smoothening-characteristic adjusting signal is inputted in the smoothening means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein;

FIGS. 4a(1), 4a(2), 4b and 4c are flow charts showing the operations of the micro-computer shown in FIG. 3;

DESCRIPTION OF THE PREFERRED EMBODIMENTS

Figure 1:
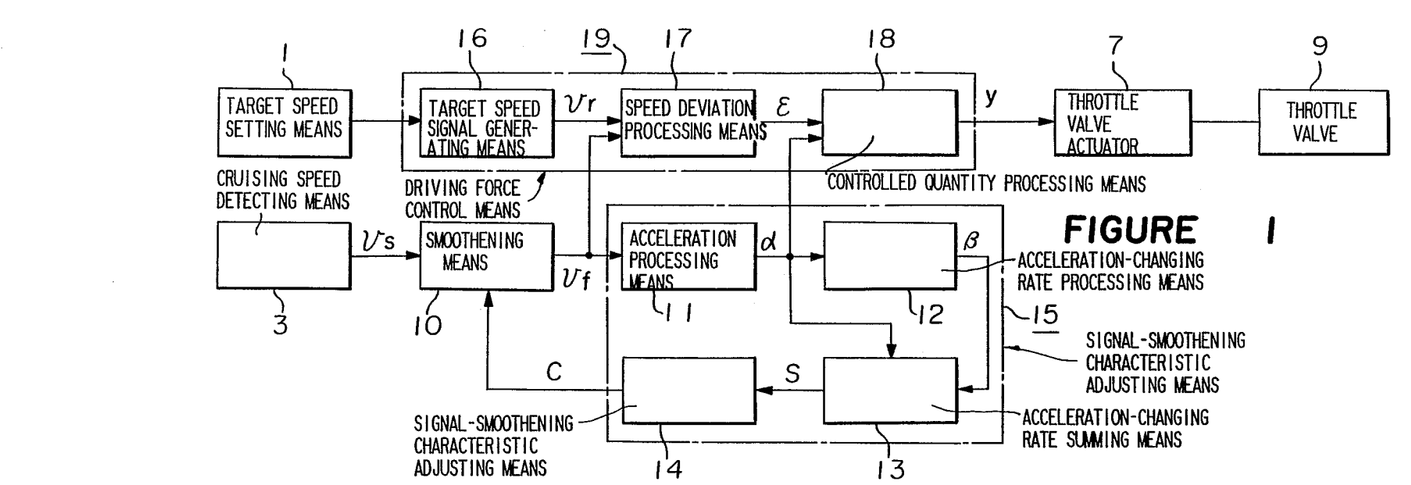
FIG. 1 is a block diagram showing an embodiment of the fixed speed cruising control apparatus of the present invention.
Figure 2:
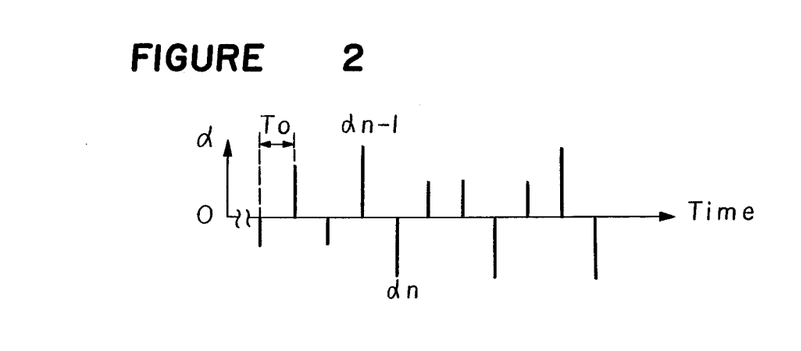
FIG. 2 is a time chart of acceleration signals produced in the apparatus shown in FIG. 1.

Referring to the drawings, wherein the same reference numerals designate the same or corresponding parts throughout the several views, and more particularly to FIGS. 1 and 2 thereof, there are shown a block diagram and a time chart of the fixed speed cruising control apparatus according to the present invention.

A reference numeral 10 designates a smoothening means for reducing electric noise components and smoothening a cruising speed signal vs generated from the cruising speed detecting means 3 as a speed sensor. The smoothening means 10 possesses changeable signal smoothening characteristics wherein signal smoothening characteristics changes upon reception of a signal-smoothening-characteristic adjusting signal c. An acceleration processing means 11 is connected to the smoothening means 10 to receive a smoothened cruising speed signal vf from the smoothening means 10 whereby an acceleration speed of the vehicle is obtained for every given time To. An acceleration-changing-rate processing means 12 is connected to the acceleration processing means 11 to receive an acceleration signal $\alpha$ from the acceleration processing means whereby an acceleration-changing-rate is obtained for every given time To. An acceleration-changing-rate summing means 13 receives both an acceleration-changing rate signal $\beta$ from the acceleration-changing-rate processing means 12 and the acceleration signal $\alpha$ from the acceleration processing means 11 whereby the signals $\beta$ produced for the every give time To are summed, in which the absolute value $|\beta|$ of each of the acceleration-changing-rate signals $\beta$ are summed for a given number of times each time when the code of the acceleration signals $\alpha$ between the values processed in the previous time and the values processed at this time is inversed. A signal-smoothening-characteristic adjusting signal processing means 14 is connected to the summing means 13 to receive the acceleration-changing-rate summing signal s and outputs the signal-smoothening-characteristic adjusting signal c on the basis of the values corresponding to the noise components in the smoothened cruising speed signals contained in the calculated values by processing the summing signals s. The acceleration processing means 11, the acceleration-changing-rate processing means 12, the acceleration-changing-rate summing means 13 and the signal-smoothening-characteristic adjusting signal processing means 14 constitute a signal-smoothening-characteristic adjusting means 15.

A target speed setting means 1 is provided so that the driver determines a desired target speed. A target speed signal generating means 16 is connected to the target speed setting means 1 to receive an output from the setting means 1 and generates a target speed signal vr. A speed deviation processing means 17 is to receive the target speed signal vr and the smoothened cruising speed signal vf to obtain a speed deviation signal $\epsilon$ ($=$vr$-$vf). A controlled quantity processing means 18 is to receive the speed deviation signal $\epsilon$ and the acceleration signal $\alpha$ to obtain a control signal y by processing them. The target speed signal generating means 16, the speed deviation processing means 17 and controlled quantity processing means 18 constitute a driving force control means 19. A reference numeral 7 designates the throttle valve actuator, as discussed before, for driving a throttle valve 9 which adjusts the output of the engine on the basis of the control signal y generated from the controlled quantity processing means 18. Description will be made as to the principle of adjusting the signal smoothening characteristics of the smoothening means 11 by detecting the electric noises contained in the cruising speed signal vs from the smoothened cruising speed signal vf in the above-mentioned apparatus. In an ideal condition that the vehicle travels at a fixed speed, the cruising speed signal vs is constant, hence the smoothened cruising speed signal vf is also constant. Accordingly, the value of the acceleration signal $\alpha$ processed for every given time To is zero. However, when the noise components are contained in the cruising speed signal vs, the cruising speed signal vs is not constant even in the fixed speed cruising. If the smoothening means 11 does not have the signal-smoothening-characteristics to cancel the noise components, the smoothened cruising speed signal vf is not constant and the value of the acceleration signal $\alpha$ is not zero. Accordingly, the noise components may be detected when the acceleration signal $\alpha$ increases and decreases. However, when the vehicle travels an uphill or a downhill at a constant speed, the acceleration signal $\alpha$ tends to deviate at the positive or negative side. Accordingly, in this case, the fact whether such deviation of the acceleration signal $\alpha$ is resulted from the noise components or the actual acceleration or deccelaration of the vehicle can not be distinguished. However, the acceleration signal $\alpha$ changed by the noise components shows such tendency that positive and negative signals alternately appear and an average value obtained by summing them is zero as shown in FIG. 2. Accordingly, by summing the differential value between an acceleration signal $\alpha$ obtained by processing the smoothened cruising speed signal processed at the present time and an acceleration signal $\alpha n-1$ obtained by processing the smoothened cruising signal at the last time (i.e. the absolute value of the acceleration-changing-rate signal $\beta$ processed for every given time To only when the code of the acceleration signal $\alpha n$ or $\alpha n-1$ is inversed), the summing operation being carried out at a suitable number of times, the acceleration-changing-rate summing signal s is obtained. The magnitude of the summing signal s correctly corresponds to the magnitude of the noise component in the cruising speed signal vs and it is in proportion to uncomfortableness in riding. Accordingly, the optimum smoothening characteristics can be realized by strengthening the filtering characteristics of a low frequency band of the smoothening means 11 so as not to greatly reduce the response of the control system when the summing signal s is large. On the other hand, by weakening the low frequency band filtering characteristics to enhance the response of the control system when the summing signal s is small the optimum smoothening characteristics can be realized.

An embodiment of the present invention will be described with reference to FIGS. 3 to 6. In the Figures the reference numerals 1 to 5, 8 and 9 designate the same parts as shown in FIG. 7. The set switch 1 corresponds to the target speed setting means 1 and the speed sensor 3 corresponds to the cruising speed detecting means 3.

A reference numeral 20 designates a micro-computer which is the same kind of control apparatus as shown in FIG. 6 and which comprises an input circuit 20a actuated by switching the main switch 5 and adapted to process signals from the set switch 1, the cancel switch 2 and the speed sensor 3, a memory 20b comprising an ROM and an RAM in which an instruction program is stored, an output circuit 20c for outputting a control signal and a CPU 20d which is operated in accordance with the instruction program of the memory 20b and processes a signal from the input circuit 20a to output a signal to the output circuit 20c. A numeral 21 designates a first electromagnetic valve controlled by the control signal y1 from the micro-computer 20. The electromagnetic valve is so adapted that when the control signal y1 is in an "L" level, communication of an input tube 21a communicated with a negative pressure source (not shown) to an input tube 21b is separated, and when the control signal y1 in an "H" level, they are communicated with each other as indicated by an arrow mark A. A numeral 22 designates a second electromagnetic valve controlled by a control signal y2. The electromagnetic valve 22 is so adapted that when the control signal y2 is in an "L" level, an input tube 22a communicated with the atmosphere is connected to an output tube 22b as indicated by an arrow mark B, and when the signal y2 is in an "H" level, the communication between them is broken. A numeral 23 designates a diaphragm device connected to the input tube 21a of the first electromagnetic valve 21 and the output tube 22b of the second electromagnetic valve 22 to actuate the throttle valve 9 through a rod 23a. The diaphragm device 23 comprises a casing 23c in which an air chamber 23b communicated with the input tube 21a and the output tube 22b is formed, a diaphragm 23d provided with the rod 23a and a spring 23e interposed between the diaphragm 23d and the inner wall of the casing 23c to push the diaphragm 23d on the right hand in FIG. 3. The diaphragm device 23 constitutes the throttle valve driving means 7 in association with the first and second electromagnetic valves 21, 23. The throttle valve driving means 7 has three kinds of operation mode as shown in Table 1. Namely, when the control signals y1 and y2 are both in the "H" level (referred to as acceleration mode), the first electromagnetic valve 21 is communicated, while the second elctromagnetic valve 22 is in non-communication. Accordingly, the air chamber 23b of the diaphragm device 23 is communicated only with the negative pressure source to move the diaphragm 23d on the left hand in FIG. 3, whereby the throttle valve 9 is opened and the vehicle is accelerated.

Figure 3:
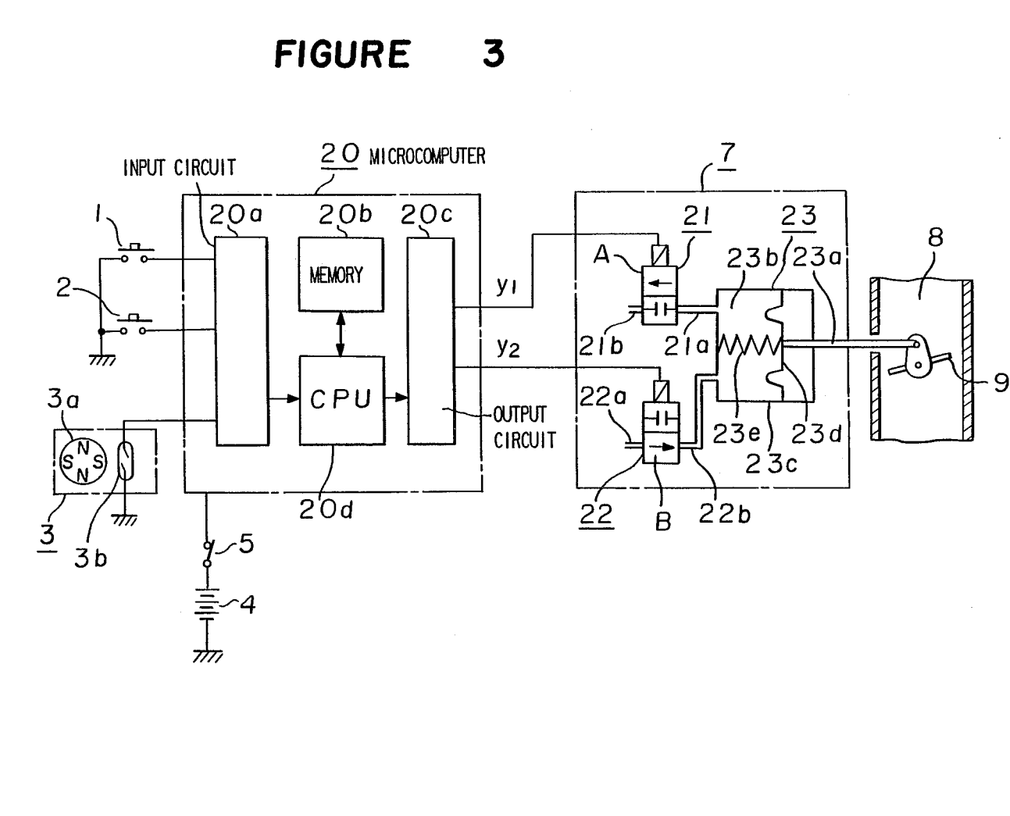
FIG. 3 is a diagram showing connection of a control section to a mechanism for operating a throttle valve.

In decceleration mode wherein the control signals y1 and y2 are both in the "L" level, the first electromagnetic valve 21 is in non-communication and the second electromagnetic valve 22 is in communication. In this case, the air chamber 23b is communicated only with the atmosphere, and the diaphragm 23d is moved on the right hand by the spring 23e, whereby the throttle valve 9 is closed and the vehicle is deccelerated.

In holding mode wherein the control signal y1 is in the "L" level and the signal y2 is in the "H" level, the first and second electromagnetic valves 21, 22 are in non-communication, and the air chamber 23b is separated from either or both of the negative pressure source and the atmosphere, whereby the diaphragm 23d is fixed at the present position and therefore, the throttle valve 9 keeps the present aperture.

TABLE 1

| Operation mode | y1 | y2 | Throttle valve |
| --- | --- | --- | --- |
| Acceleration mode | H | H | Open |
| Decceleration mode | L | L | Close |
| Holding mode | L | H | Constant |

The operation of the micro-computer 20 will be described with reference to flow charts of FIGS. 4a(1) and 4a(2) to 4c as well as the control apparatus as shown in FIG. 3.

On actuation of the main switch 5, the micro-computer 20 starts its operation.

Figure 5:
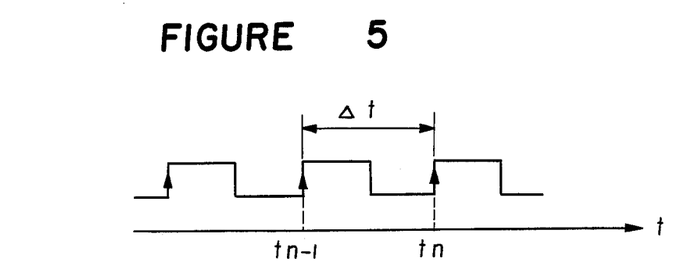
FIG. 5 is a diagram showing an output waveform from a speed sensor 3 shown in FIG. 3.

First, a main routine process shown in FIG. 4a(1) is carried out. On the other hand, the speed sensor 3 outputs a signal of a pulse train having a frequency in proportion to the speed of the vehicle as shown in FIG. 5 during travelling of the vehicle. The pulse train signal is supplied to the micro-computer 20 in which an interrupt routine process is carried out. Namely, the process as shown in FIG. 4b is carried at out every time when there appear rising portions in the pulse train signal shown in FIG. 5. A timer (not shown) counts time corresponding to each rising time tn (Step 201) and the difference $\Delta t$ between the present rising time tn and the last rising time $tn-1$ ($=tn-tn-1$) is calculated at Step 202, and thereafter the process is returned to the main routine process shown in FIG. 4a(1). Thus, by obtaining the period of the pulse train signal, the cruising speed is obtained by conversion of the inversed figure of the value of the pulse train signal.

When the driver operates the set switch 1 to start fixed speed cruising for the vehicle, a signal indicating the operation of the switch is received by the microcomputer 20 at Step 102 in FIG. 4a(1). Then, determination is made as to whether or not the set switch is turned-on at Step 103. If YES, the actual cruising speed vs ($=g/\Delta t$ wherein g is a constant for conversion for speed) is calculated on the basis of the last pulse period Δt which is obtained by the previously mentioned interrupt routine process shown in FIG. 4b (Step 104). At Step 105, the actual cruising speed signal vs is determined as the target speed signal vr. Then, at Step 106, "1" indicative of fixed speed cruising is set for a flag F which is a factor for the fixed speed cruising. Then, operations from Step 102 to Step 110 are repeatedly carried out, during which the fact that whether or not a predetermined time To (such as 300 ms) has lapsed is examined by the timer (Step 110). If the fact that the time To has lapsed is detected, determination is made as to whether or not the flag F is "1", at Step 111. If YES, the processes from Step 112 to 132 in FIG. 4a(2) are conducted.

The sequential operation from Step 112 to 132 will be described.

First, a cruising speed signal vn is calculated as is in Step 104 (Step 112). At Step 113, a smoothened cruising speed signal vfn is calculated by smoothening the cruising speed signal vn by using the following equation of transfer function which shows smoothening characteristics of a digital filter:

$$vfn = a(vn+vn-1)+(1-2a)vfn-1 \quad (1)$$

Where vfn is a smoothened cruising speed signal at the present time, vfn−1 is a smoothened cruising speed signal at the last time, vn−1 is a cruising speed signal at the last time and a is a variable coefficient. The digital filter shows a low-pass filter characteristics wherein when the variable coefficient a is large, the frequency of interruption becomes high; on the other hand, when it is small, the frequency becomes low.

At next Step 114, a speed deviation signal εn (=vr−vfn) is obtained by the target speed signal vr and the smoothened cruising speed signal vfn. Then, an acceleration signal αn ((=vfn−vfn−1)/To) is obtained by the smoothened cruising speed signals vfn and vfn−1 at Step 115. Further, an acceleration-changing-rate signal βn (=(αn−αn−1)/To) is obtained by the acceleration signal αn calculated at the present time at the Step 115 and the acceleration signal βn−1 obtained by calculation in the last time at Step 116. During Steps 117 to 121, summing of the absolute value |βn| of each of the acceleration-changing-rate signals βn obtained at Step 116 is carried out. In more detail, determination is made as to whether or not the acceleration signal αn−1 calculated at the last time is zero. If NO, then, determination is made as to whether or not the code of the acceleration signal αn calculated at present time is opposite to the acceleration signal αn−1 calculated at the last time at Step 118. If YES, a summed value s is obtained by the absolute value |βn| at Step 119, and the number of summing i is renewed at Step 120. If the number of summing i has already reached a predetermined number N in the renewing operation, then, operations as shown by the Steps 122 to 129 are taken. On the other hand, if the number of summing i does not reach the predetermined number N, operation at Step 130 is taken. Explanation in the former case will be made. At Steps 122 and 123, determination is made as to whether or not the summed value s is greater than given values s1 and s2 (s1<s2). When the summed value is smaller than the given value s1, namely s≦s1, then, the coefficient Δa of the digital filter is compared with an upper limit value a2 which is previously determined at Step 124. If the coefficient a is lower than the upper limit value a2 (e.g. one half), a predetermined value Δa is added to the coefficient a at Step 125. If the coefficient a reaches the upper limit value a2, then Step 129 is taken.

When the summed value s is between the given values s1 and s2, i.e. s1<s<s2, then, Step 129 is taken. If the summed value s is greater than the given value s2, i.e. s2≦s, the coefficient a of the digital filter is subtracted by the given value Δa at Step 128. Prior to Step 128, if the coefficient a reaches a lower limit value a1 (e.g. 8/16) which is previously determined, operation is carried out at Step 129. Increase the coefficient a means that the low-pass filter characteristics of the digital filter is weakened, whereas decrease the coefficient a means that the characteristics is strengthened as clearly shown by the equation (1). When the value of the coefficient a is determined, the number of summing i and the summed value s are respectively cleared to be zero at Step 129. Thus, when the valiable coefficient a of the digital filter is determined, the controlled quantity to adjust the degree of opening of the throttle valve 9 is processed and an output for controlling the aperture of the valve 9 is generated (Steps 130 and 131). Namely, time T (o≦T≦To) during which the control signals y1 and y2 are generated is obtained by the following equation at Step 130:

$$T = K1\varepsilon n + K2\alpha n \quad (2)$$

Where K1 is a coefficient to obtain the speed deviation signal εn and K2 is a coefficient to obtain time T from the acceleration signal αn. Once the output time T is obtained, an output level of each of the control signals y1 and y2 is obtained from Table 2 depending on the code of the output time T at Step 131.

TABLE 2

| T | Control mode | y1 | y2 |
|---|---|---|---|
| Positive | Acceleration mode | H | H |
| Negative | Decceleration mode | L | L |
| 0 | Holding mode | L | H |

Then, a timer is set in such a manner that the control signals y1 and y2 are outputted in the time T, and the sequantial operation is returned to Step 102 to thereby repeat the operations 102–110 during the time To.

Figure 6:
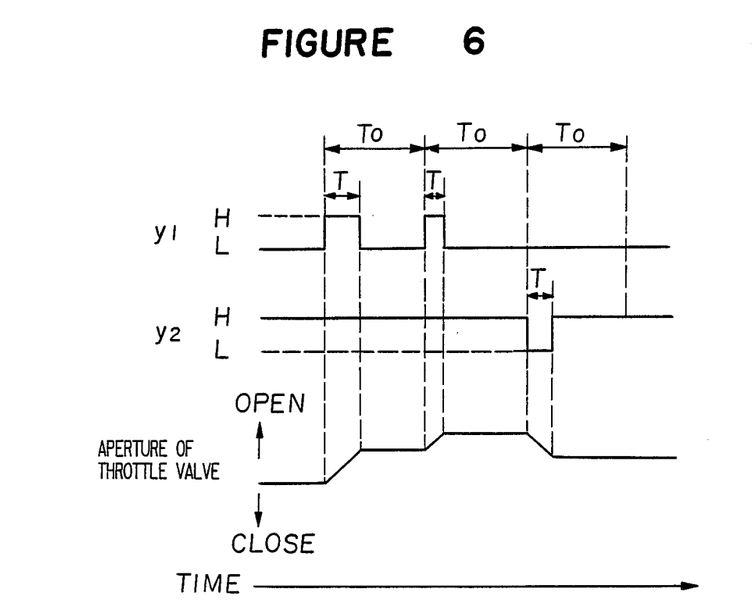
FIG. 6 is a time chart showing the operation of a throttle valve 9 actuated by control signals y1 and y2.

On the other hand, on the lapse of the time T in the timer, a time interruption signal is produced to carry out timer interruption routine processing as shown in FIG. 4c. Namely, on the lapse of the time T, an output level in the holding mode is established for the control signals y1 and y2 as shown in Table 1. Accordingly, the output for the acceleration mode or the decceleration mode in the output time T is given to the throttle valve driving means 7 from the micro-computer 20 for every given time To. In the acceleration mode, the air chamber 23b of the diaphragm device 23 is decreased, whereby the diaphragm 23d moves on the left hand in the drawing to open the throttle valve 9 by a predetermined quantity of aperture. In the decceleration mode, the air chamber 23b is expanded, whereby the diaphragm 23d is moved on the right hand to close the throttle valve 9 by a predetermined quantity. FIG. 6 shows an example of the operations as described above.

Figure 4:
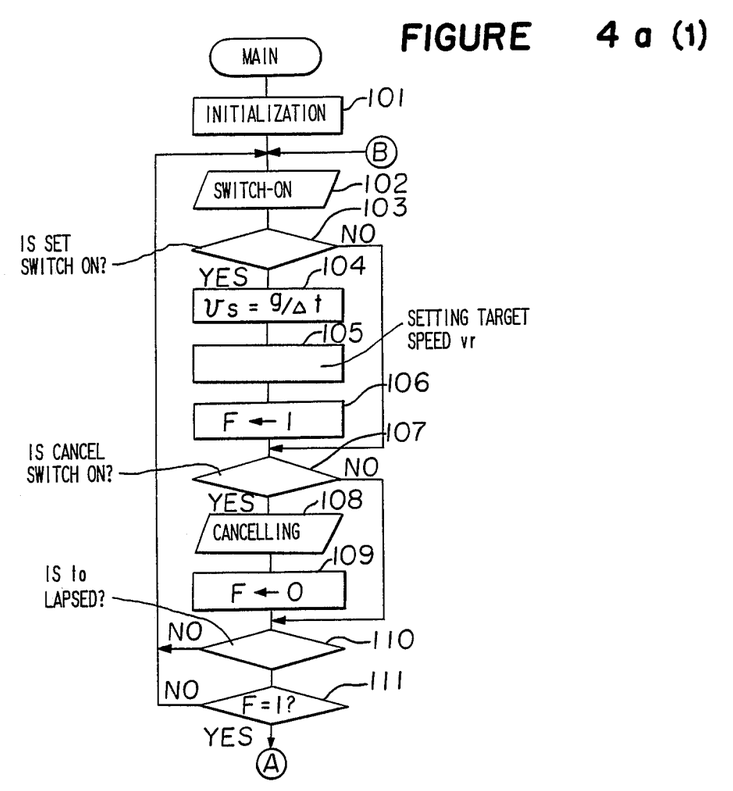
Figure 4A:
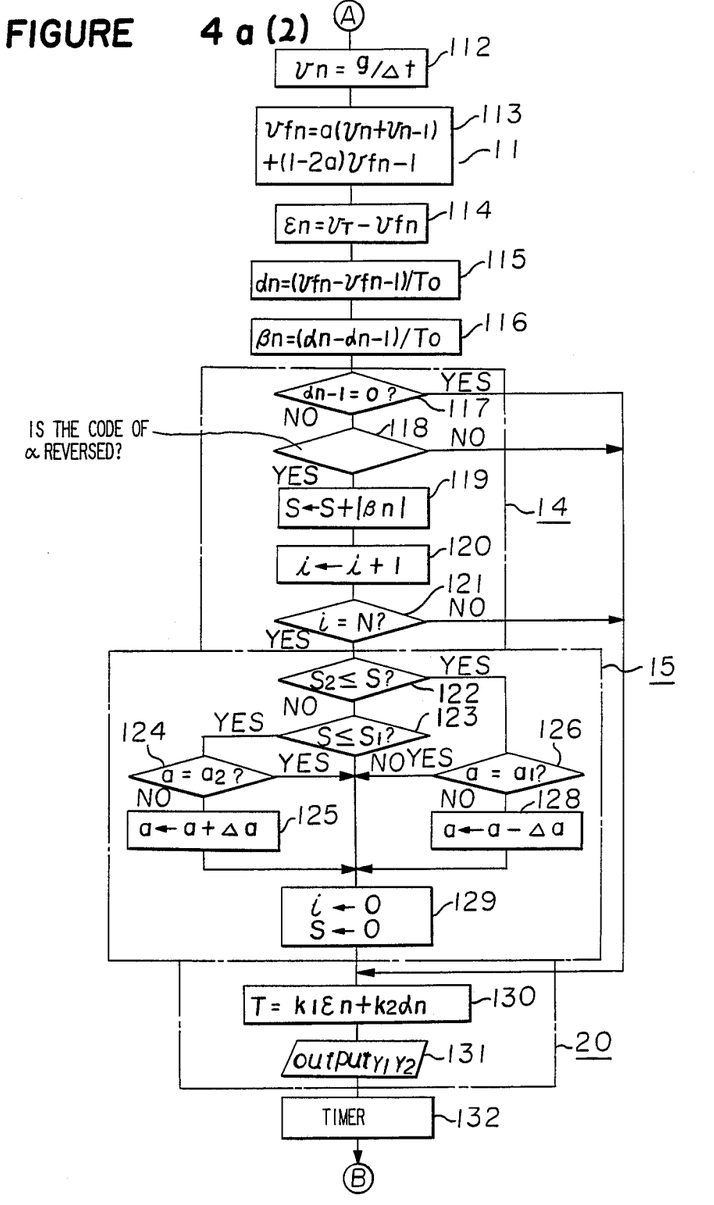

During fixed speed cruising control for the vehicle, when a driver operates the break device, the cancel switch 2 is closed and a signal generated from the cancel switch 2 is detected by the micro-computer 20 (these processes correspond to Steps 102-107 in FIG. 4a). When the signal of the cancel switch 2 is detected by the micro-computer 20, the fixed speed cruising control is cancelled at Step 108. Namely, the control signals y1 and y2 are brought to an "L" level. By this operation, the air chamber 23b of the diaphragm device 23 is always communicated with the atmosphere, and the driver can adjust the throttle valve 9.

Then, "0" which implys that the vehicle is not under fixed speed cruising condition is established for the flag F. During this condition, the operations from Step 112 to Step 132 are not carried out until the set switch 1 is again operated. In the foregoing description; Step 113 corresponds to the smoothening means 10; Step 115 corresponds to the acceleration processing means 11; Step 116 corresponds to the acceleration-changing-rate processing means 12; Steps 117 to 121 correspond to the acceleration-changing-rate summing means 13; Steps 112 to 129 correspond to the signal-smoothening-characteristic adjusting signal processing means 14; Steps 104 to 105 correspond to the target speed signal generating means 16; Step 114 corresponds to the speed deviation processing means 17, and Steps 130 to 131 correspond to the controlled quantity processing means 18 respectively.

Thus, in Steps 117 to 129 corresponding to the acceleration-changing-rate summing menas 13, the summed value s is obtained by summing for a given number of times the absolute value $|\beta n|$ of the acceleration-changing-rate signal $an$ when the code of the acceleration signals becomes opposite between the acceleration signal $an$ obtained at this time and the acceleration signal $an-12$ obtained at the last time. The summed value s corresponds to the noise components contained in the smoothened cruising speed signal vf. By determining the variable coefficient a of the digital filter at Steps 112 to 129 corresponding to the signal-smoothening-characteristic adjusting signal processing means 15 depending on the magnitude of the summed value s, the smoothening characteristics of the digital filter is renewed at Step 113 as the smoothening means 10. Accordingly, the smoothened cruising speed signal vf outputted from the smoothening means includes small noise components which assurses high response of the control system. Since the speed deviation signal en and the acceleration signal $an$ become small respectively and the output time T processed at Steps 130 and 131 which correspond to the controlled quantity processing means 18 also becomes small, undesired adjusting operations during the fixed speed cruising are reduced. Accordingly, shocks at the acceleration and deccelaration of the vehicle are also minimized and comfortable fixed speed cruising can be obtained.

In the above-mentioned embodiment, the digital filter having the function expressed by the equation 1 is used. However, it is possible to use another kind of a digital filter.

A motor driven throttle valve driving means 7 may be used instead of that comprising the electromagnetic valves 21 and 22 and the diaphragm device 23 as described above.

Thus, the fixed speed cruising control apparatus according to the present invention is so contructed that the variable smoothening characteristics of the smoothening means is changed by receiving the signal-smoothening-characteristic adjusting signal which is obtained by the signal-smoothening-characteristic adjusting means on the basis of the smoothened cruising speed signal. Accordingly, the noise components contained in the smoothened cruising speed signal are minimized so that high response of the control system is obtained, whereby there is provided stable acceleration and decceleration control, hence, comfortable fixed speed cruising is obtainable.

Obviously, numerous modifications and variations of the present invention are possible in light of the above teachings. It is therefore to be understood that within the scope of the appended claims, the invention may be practiced otherwise than as specifically described herein.

What is claimed is:

1. A fixed speed cruising control apparatus for a vehicle which comprises:
    a cruising speed detecting means for detecting cruising speed of a vehicle to generate a cruising speed signal,
    a smoothening means having changeable smoothening characteristics which receives said cruising speed signal to smoothen the same and outputs a smoothened cruising speed signal,
    a signal-smoothening-characteristic adjusting means which receives said smoothened cruising speed signal and processes the same to output a signal-smoothening-characteristic adjusting signal so as to cancel a signal of noise component in said smoothened cruising speed signal which is included in an output value obtained by processing;
    a driving force control means which compares said smoothened cruising speed signal generated from said smoothening means with a target speed signal for maintaining the vehicle at a given target speed to thereby control a driving force to said vehicle, wherein said signal-smoothening-characteristic adjusting signal is inputted in said smoothening means.

2. The fixed speed cruising control apparatus according to claim 1, wherein said signal-smoothening-characteristic adjusting means comprises:
    an acceleration processing means for processing several smoothened cruising speed signals generated for every predetermined time period to output an acceleration signal,
    an acceleration-changing-rate processing means for processing said acceleration signal for every predetermined time period to output an acceleration-changing-rate signal,
    an acceleration-changing-rate summing means for summing, for a given number of time, the absolute value of each of said acceleration-changing-rate signals when the code of said acceleration signal is inversed to thereby output an acceleration-changing-rate summing signal, and
    a signal-smoothening-characteristic adjusting signal processing means for outputting a signal-smoothening-characteristic adjusting signal on the basis of said acceleration-changing-rate summing signal from said acceleration-changing-rate summing means.

3. The fixed speed cruising control apparatus according to claim 1, wherein said smoothening means is a digital filter.

4. The fixed speed cruising control apparatus according to claim 1, wherein said driving force control means comprises a target speed signal generating means, a speed deviation processing means and a controlled quantity processing means.

* * * * *